(12) United States Patent  (10) Patent No.: US 7,413,369 B2
Kienzler  (45) Date of Patent: Aug. 19, 2008

(54) LOCK PIN WITH PUSHBUTTON-OPERATED AXIAL LOCKING AND FREE BEARING

(75) Inventor: Rudolf Kienzler, Furtwangen (DE)

(73) Assignee: Otto Ganter GmbH & Co. KG, Furtwangen (DE)

( * ) Notice: Subject to any disclaimer, the term of this patent is extended or adjusted under 35 U.S.C. 154(b) by 0 days.

(21) Appl. No.: 10/802,298

(22) Filed: Mar. 16, 2004

(65) Prior Publication Data

US 2004/0208691 A1   Oct. 21, 2004

(30) Foreign Application Priority Data

Mar. 25, 2003   (DE)   ............................. 103 13 170

(51) Int. Cl.
*F16B 21/14*   (2006.01)
(52) U.S. Cl. .................................... 403/322.1
(58) Field of Classification Search ............... 403/150, 403/153, 154, 325–327, 321, DIG. 4, 322.1–322.4; 70/23, 34, 32; 411/348, 21
See application file for complete search history.

(56) References Cited

U.S. PATENT DOCUMENTS

| 575,032 | A | * | 1/1897 | Kimbrell | ...................... 278/96 |
| 2,408,560 | A | * | 10/1946 | Keehn | ......................... 411/344 |
| 3,534,650 | A | * | 10/1970 | Kubokawa | .................. 411/344 |
| 3,921,334 | A | * | 11/1975 | Black, Sr. | ....................... 49/56 |
| 4,355,917 | A | * | 10/1982 | Bunger | ......................... 403/24 |
| 4,553,889 | A | * | 11/1985 | Le Dantec et al. | ............ 411/21 |
| 4,582,079 | A | * | 4/1986 | Fields | ......................... 135/75 |
| 4,764,065 | A | * | 8/1988 | Johnson | ....................... 411/21 |
| 4,822,226 | A | | 4/1989 | Kennedy | |
| 5,517,734 | A | * | 5/1996 | Korpi | ........................... 24/453 |
| 6,193,261 | B1 | * | 2/2001 | Hahka | ......................... 280/515 |
| 6,722,711 | B2 | * | 4/2004 | Kitzis | ........................... 292/145 |
| 6,752,562 | B2 | * | 6/2004 | Mills et al. | ............... 403/322.1 |
| 2003/0170070 | A1 | * | 9/2003 | Mills et al. | .................. 403/154 |

FOREIGN PATENT DOCUMENTS

| DE | 3223302 | * | 12/1983 |
| DE | 3223302 A1 | | 12/1983 |
| DE | 10154692 A1 | | 5/2003 |
| DE | 10313170 B3 | | 8/2004 |

* cited by examiner

*Primary Examiner*—Daniel P. Stodola
*Assistant Examiner*—Joshua T Kennedy
(74) *Attorney, Agent, or Firm*—Cooper & Dunham LLP

(57) ABSTRACT

A lock pin with pushbutton-operated axial locking has two locking elements which point in opposite directions and are mounted in radially outwards directed recesses in the body. To ensure a good, wear-resistant pivotal mounting of the two locking elements, combined with good locking action and resistance to shearing, the invention provides that the locking elements create a virtual, freely guided pivoting axis in their connection zone. The result is a pinless mounting of the locking elements.

4 Claims, 4 Drawing Sheets

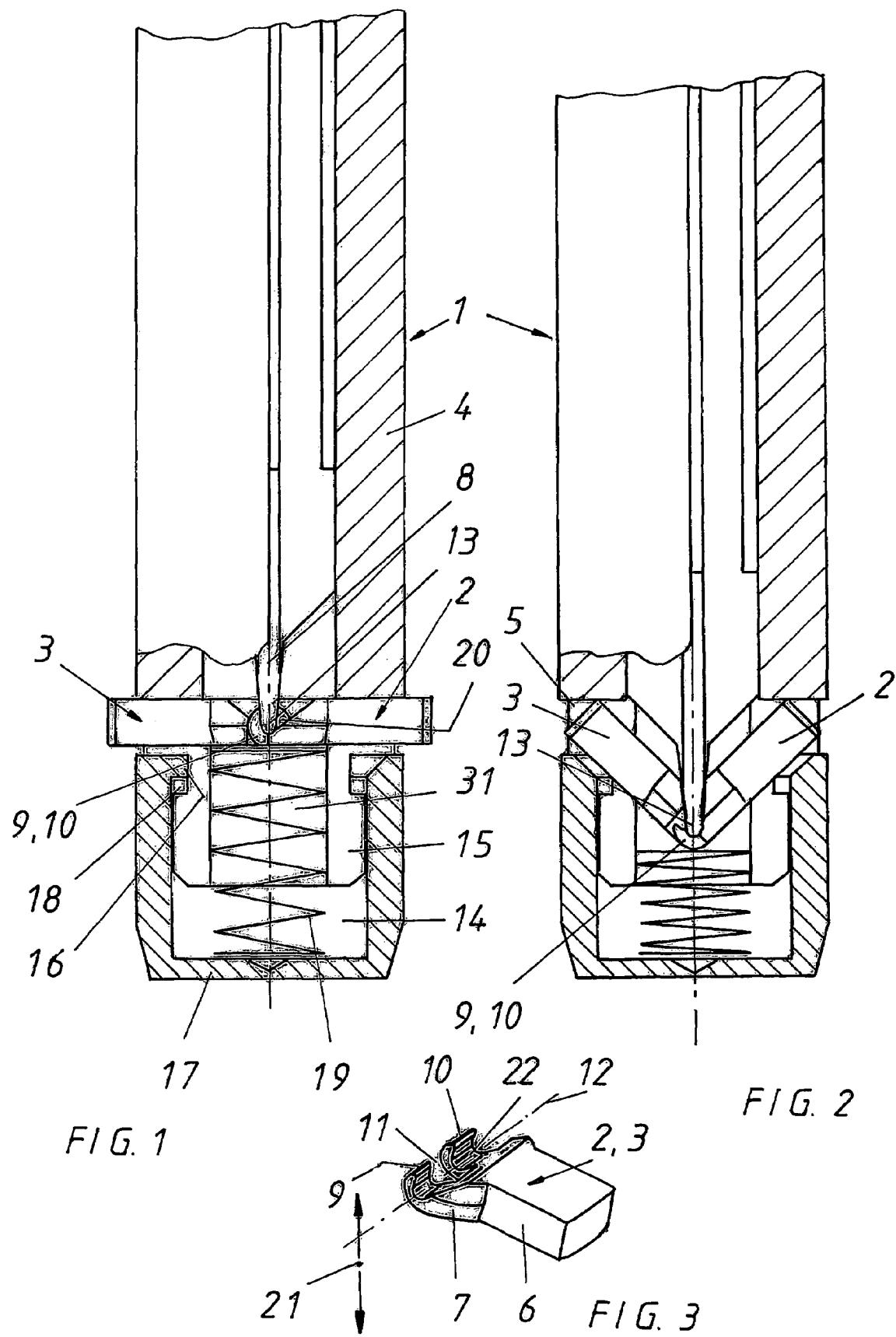

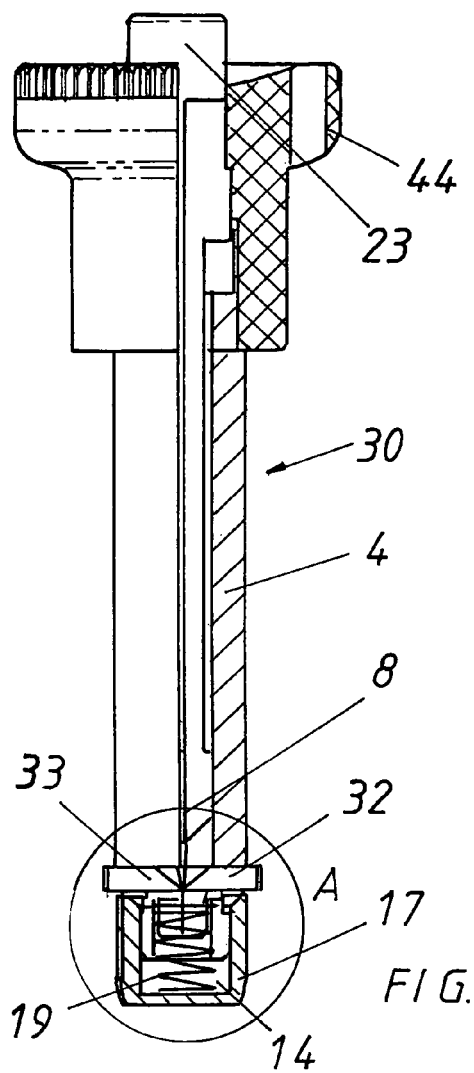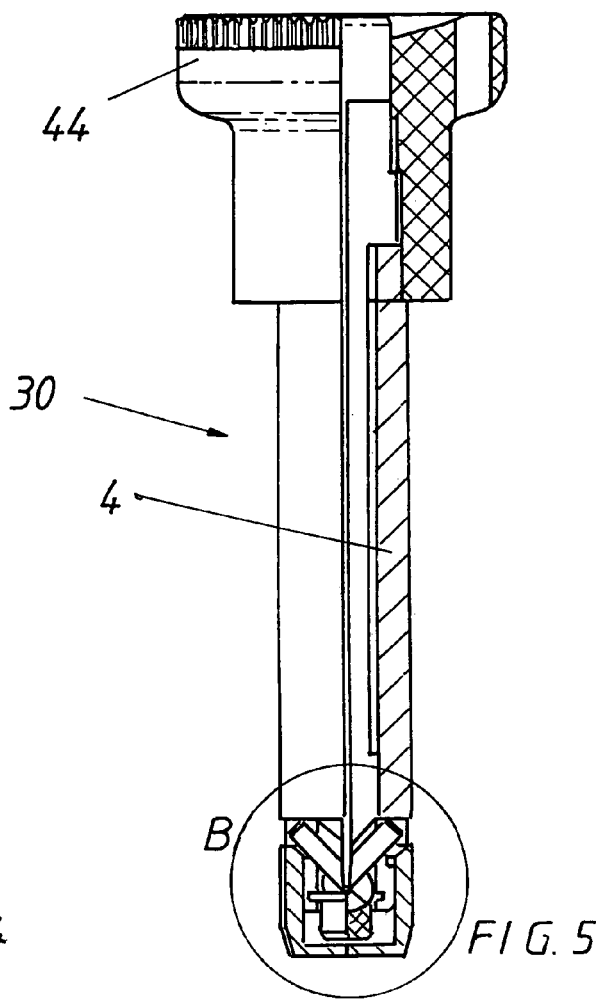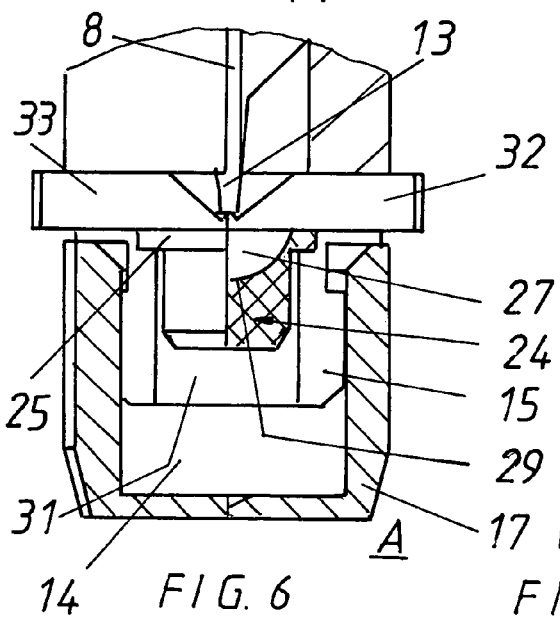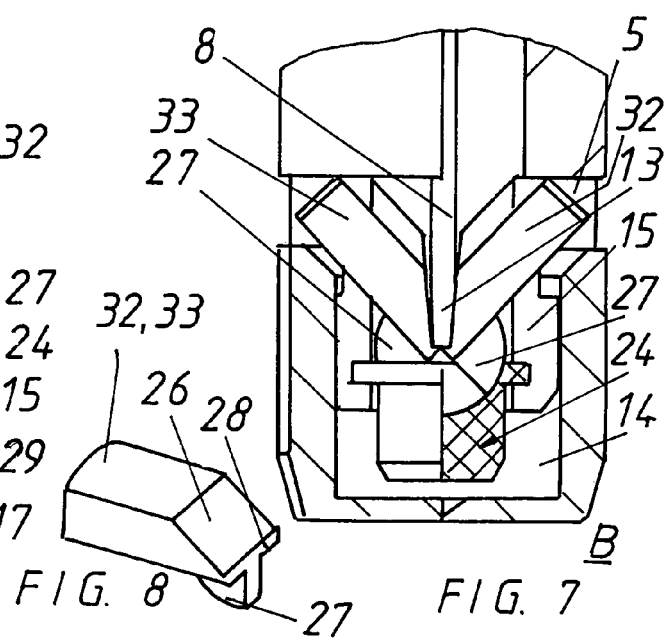

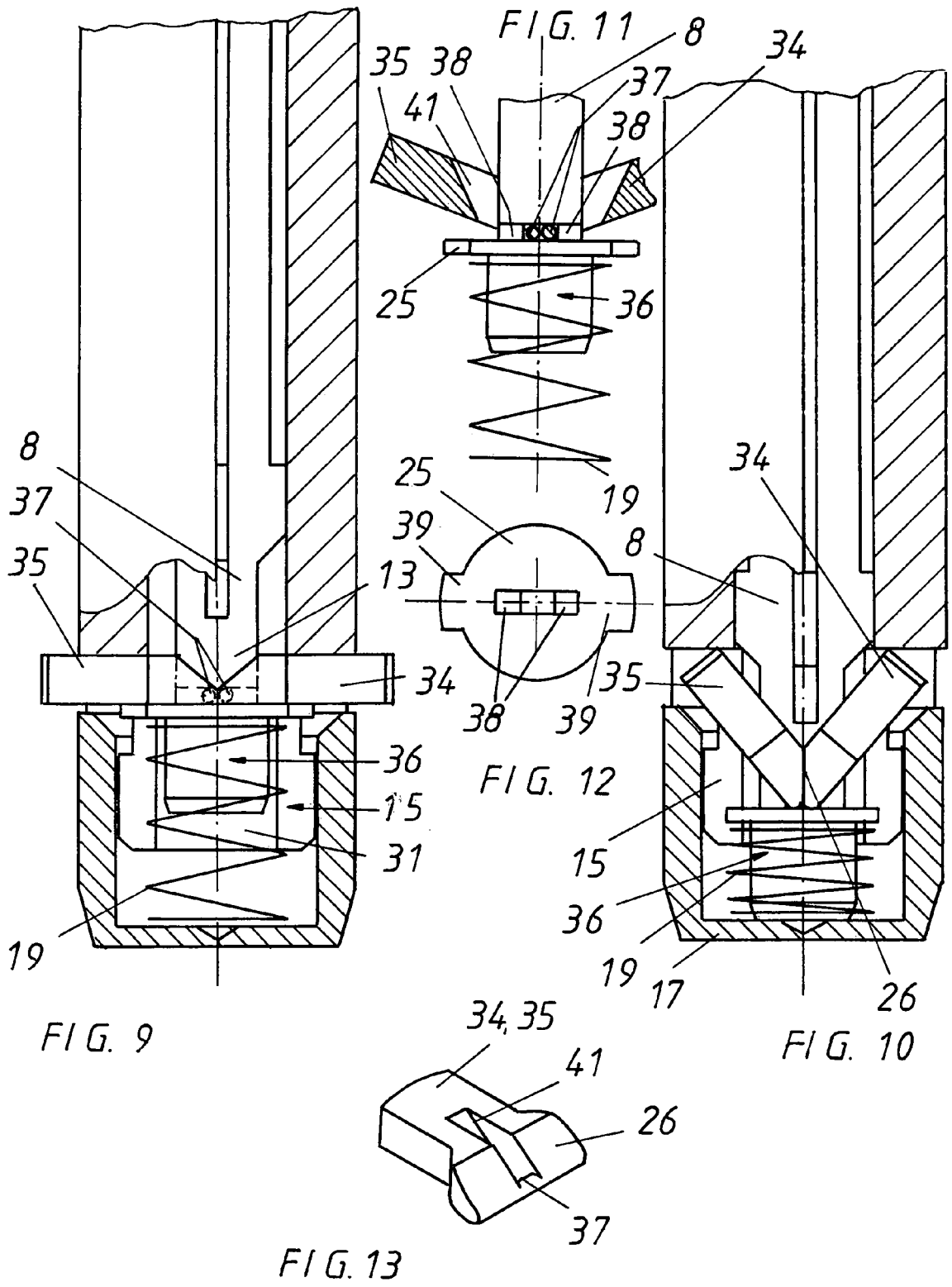

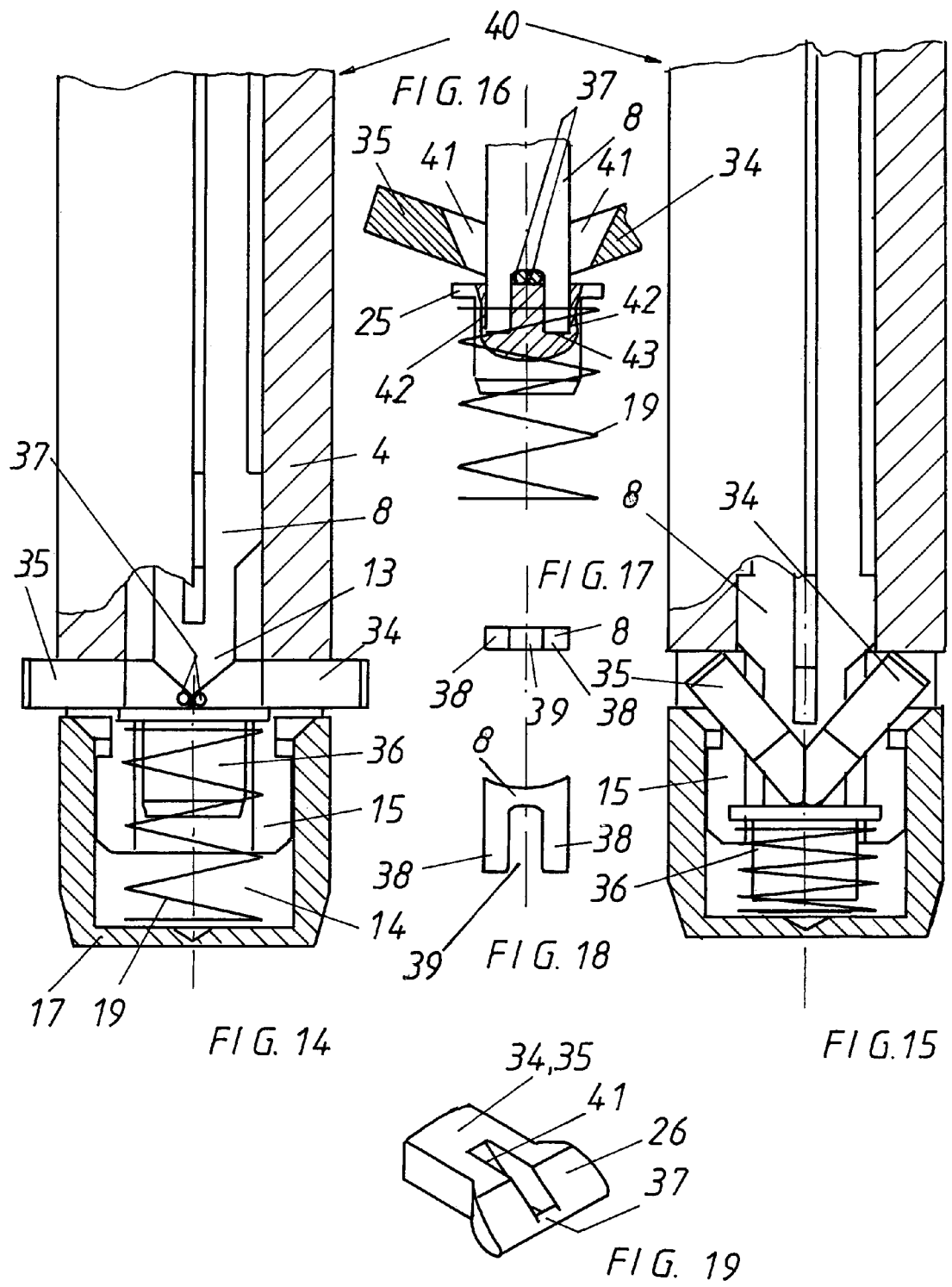

LOCK PIN WITH PUSHBUTTON-OPERATED AXIAL LOCKING AND FREE BEARING

BACKGROUND OF THE INVENTION

The subject-matter of the invention is a lock pin with pushbutton-operated axial locking according to the introductory part of Claim 1. Lock pins of this type are used as machine elements. The pin part is inserted through a seat in a machine part so that it transfixes two machine parts possessing a common aligned bore. Pushbutton-operated spring-loaded locking elements are arranged at the forward free end of the pin part.

DE 10154692.0-24 originating from the same applicant, and constituting a prior right, describes a lock pin with pushbutton-operated axial locking according to the introductory part of claim 1 wherein the locking elements are configured as catches. The same document also showed that the locking element can have a film hinge, provided that it is made from plastic material. Here, however, there are conflicting objectives, since on the one hand the material needs to be sufficiently flexible to form a serviceable film hinge, and on the other hand the locking elements need to have sufficient mechanical strength not to shear off while in locking engagement.

Known from the unrelated field of hinged dowels are shaft-mounted pivotable locking elements which are initially passed through a hole in a wall-opening in the folded-down position and are then deployed and pivoted into the locking position by means of a screw thread.

Such hinged dowels, however, are not suitable for the repeated operation required in the context of machine parts. In particular, they are not designed for fatigue loading, as the locking position usually has to be provided only once.

Incidentally, these unrelated catches lock in only one direction, whilst in the other direction, they are retractable.

Therefore the problem which lies at the basis of the invention is to develop a lock pin with pushbutton-operated axial locking of the kind stated at the outset so that it can be used repeatedly for machine elements, and is able to sustain high breaking loads and shear forces.

SUMMARY OF THE INVENTION

For the solution to this problem, the invention is characterized by the technical teaching of Claim 1. The essential feature of the invention is that the locking elements according to the invention have a rigid, rather than a flexible, design, and the hinge axis is designed as a virtual bearing-axis. Therefore a hinge pin that could become worn or even break under repeated flexing is no longer needed.

In a first preferred embodiment, the end of the pushrod forms a bearing shaft, while the catches themselves form bearing shells with a semi-circular configuration. This engineering design has proved effective. Nevertheless assembly is difficult where such a locking element is intended for use in through bores of less than 6 mm diameter. In another configuration of the present invention, the bearing of the catch is shifted outwards to a plunger that has a semi-circular slot in which lobes, shaped as quadrants, of the two catches are carried.

Instead of the configuration shown, i.e. a lobe, the bearing of the catches may also be provided as a rib configured as a quadrant and extending over the full width.

In a third variant of the invention, the pushrod has an approximately rectangular recess in which the two catches are mounted. In this case the catches have separate, slightly outwards-displaced bearing-axes.

The recess can of course be located on the opposite side, e.g. by configuring accordingly a spring plunger like the one used in the second embodiment.

A further feature is that the pushrod is steadied on the other side by being "guided" in the above-mentioned spring-loaded plunger. At the same time, by resting on this plunger, the bearing-axes of the catches have a better mounting, that is to say, they are supported on both sides.

The pushrod may be guided in the plunger by a slot or an annular groove, or simply by guiding the pushrod externally or internally on the above-described recess.

BRIEF DESCRIPTION OF THE DRAWINGS

The invention will now be described in detail with the aid of a drawing showing just one way of carrying out the invention. Further essential features and advantages of the invention will follow from the drawing and from its description.

In the drawings:

FIG. 1 shows a section through a first embodiment of a lock pin according to the invention in the locked condition, FIG. 2 shows the view of FIG. 1 in the unlocked condition, FIG. 3 is a perspective view of a locking element, FIG. 4 shows a section through a second embodiment of a lock pin in the locked condition, FIG. 5 shows the view of FIG. 4 in the unlocked condition, FIG. 6 shows an enlarged view as FIG. 4 but with spring omitted, FIG. 7 shows an enlarged view as FIG. 5, FIG. 8 is a perspective view of the locking element, FIG. 9 shows a third embodiment of the invention, in section, in the locked condition, FIG. 10 shows the view of FIG. 9 in the unlocked condition, FIG. 11 shows a modified form of the embodiment shown in FIG. 9, FIG. 12 is a view from above of the embodiment of FIG. 11, with the locking elements omitted, FIG. 13 is a perspective side view of a locking element, FIG. 14 shows a section through a fourth embodiment of a lock pin in the locked condition, FIG. 15 shows the view of FIG. 14 in the unlocked condition, FIG. 16 shows, in section and on an enlarged scale, a modified form of the embodiment shown in FIG. 14, FIG. 17 is an end view of the pushrod, FIG. 18 is a side view of the pushrod, FIG. 19 is a perspective view of a locking element for use in FIGS. 14 to 18.

DETAILED DESCRIPTION OF THE INVENTION

The lock pin 1 shown in FIGS. 1 and 2 consists of an approximately cylindrical or square body 4 in whose central recess a pushrod 8 is longitudinally displaceably guided. As FIGS. 4 and 5 show, the pushrod 8 has at its upper end an operating button 23 which is displaceable relative to a bearing block 44 fixed with respect to the body of the pin. A circumferential recess 18 into which cap 17 is latched by inwards directed projections 16 is arranged at the free, lower end of the body 4.

It is also feasible to provide the cap 17 with a screwed connection to the body 4, instead of the latched connection 16, 18.

The body 4 is extended downwards in the form of a bearing thimble 15. The circumferential recess 18 is located in this area.

A spring element 19 is contained interior 14 the bearing thimble 15. This spring element 19 bears at one end on the bottom of the cap 17 and at the other end on the underside of two locking elements 2, 3 which point in opposite directions.

In the locked condition, each locking element 2, 3 sticks out of a recess 5. These recesses 5 are opposite each other and are approximately radially aligned.

According to the invention the bearing-axis of the two locking elements 2, 3 is pinless. That is to say, as shown in FIG. 3, each locking element 2, 3 is configured as a one-sided bevel 7 which springs from an approximately rectangular locking body 6 and on the forward, free end of which, two claws 9, 10, approximately semi-circular in shape and spaced apart from each other, are formed.

A gap 11 is formed between the two claws; and the space between the claws 9, 10 of one locking element 2 forms a bearing shell 22 for the opposite locking element 3 (not shown in the drawing), which engages by a single, likewise semi-circular, claw into the gap 11 between the claws 9, 10 of the locking element 2.

Thus, the two locking elements 2, 3 fit together in the region of a common bearing shell 22, so forming the said virtual hinge axis 12.

As FIG. 1 shows, the pushrod 8 reaches into the two locking elements by its lower end, which is configured as a blade 13.

It can be seen from FIG. 1 how the claw 20 on the locking element 3 engages in the gap 11 between the claws 9, 10 of the locking element 2.

Upon operation of the pushbutton 23, the pushrod 8 is pushed down against the spring element 19, and the two locking elements 2, 3 are tilted downwards in the recess 5, producing the unlocked position shown in FIG. 2.

FIG. 1 also shows the central recess 31 in the bearing thimble 15 in which the spring element 19 is mounted.

Instead of a helical compression spring, any other known stored-energy device such as elastomer springs, leg springs or spiral springs can, of course, be used.

Upon operation of the pushrod 8, the virtual bearing-axis between the two locking elements 2, 3 therefore undergoes an axial displacement in the direction of the arrow 21 of FIG. 3.

Instead of forming the hinge axis 12 by the interlocking claws 9, 10, 20, FIGS. 4 to 7 show a different embodiment.

Here, as shown in FIGS. 4 to 8, the bearing-axis is defined by forming a guide web 27, approximately in the shape of a quadrant, on each locking element 32, 33.

Each locking element 32, 33 again consists of an approximately rectangular solid body, with a bevel 26 at its inner end. The bevel 26 tapers to a stop fin 28 on the end face.

Both guide webs 27 of the locking elements 32, 33 engage in a guide slot 29 in a bearing plunger 24, as shown in FIG. 6.

In FIGS. 6 and 7 the spring element 19 has been omitted in order to simplify the drawing.

Nevertheless FIG. 6 shows that when the bearing plunger 24 is in the raised position it bears, by a radially outwards directed shoulder 25 with increased diameter, on the underside of the locking elements 32, 33 pointing radially in opposite directions.

Upon operation of the pushrod 8, the blade 13 of the pushrod 8 moves into the gap between the two locking elements 32, 33 and strikes both stop fins 28.

This causes the two locking elements 32, 33 to tilt in the recess 5 concurrently with the axial downward displacement of the bearing plunger 24, as shown in FIG. 7.

Thus in the lock pin 30 shown in FIGS. 4 to 8 the virtual pivot-bearing between the two locking elements 32, 33 is formed by a pivoting bearing of each guide web 27 in a guide slot 29 in a bearing plunger 24 that is axially guided under spring loading.

It will be obvious that additional axial guidance of the bearing plunger 24 can also be provided in the region of the recess 31.

Such axial guidance of the bearing plunger 24 can thus be provided in the region of both the surrounding bearing thimble 15 and of the bearing shell 14.

The advantage of this arrangement is that it, too, provides a pinless pivot-bearing between the locking elements 32, 33. This pivot-bearing therefore works with little or no wear and can be rated for a high number of load cycles.

Although the guide web 27 of FIG. 8 on the underside of each locking element 32, 33 is relatively narrow, it can, in another embodiment, be made wider. The width of the guide web can also be matched to that of the locking element 32, 33.

In the further embodiment shown in FIGS. 9 to 13, an approximately rectangular recess is formed at the lower end of the pushrod 8 between two parallel, endwisely-arranged fork-extensions 38.

Somewhat pin-like, round-profiled bearing-axles 37, which are straddled by the fork-extensions 38, are arranged at the inward ends of the two locking elements 34, 35.

The bearing-axles 37 press on the shoulder 25 of increased diameter which is joined to the spring-loaded axially displaceable bearing plunger 36.

Thus, when pressure is applied to the pushrod 8, the bearing plunger 36 is displaced downwards into the region of the cap 17, against the force of the spring element 19, and the two locking elements 34, 35 pivot inwards into the unlocked position.

Incidentally, FIG. 13 shows that the locking elements 34, 35 can have slots 41 instead of being joined to bearing-axles 37.

The fork-extensions 38 of the pushrod 8 engage in these slots 41 so that here, too, a virtual pivot-bearing of the locking elements 34, 35 manifests itself.

The locking elements 34, 35 are thereby juxtaposed in the region of their bevels 26, as shown in FIG. 10.

As FIGS. 9 and 10 show, the bearing plunger 36 is guided axially, and prevented from skewing, in the bearing thimble 15 on the opposite side to the pushrod 8. For this purpose the shoulder 25 of the bearing plunger 36 has radially outwards directed extensions 39 affording linear guidance on the bearing thimble 15.

The bearing-axes thereby created on the locking elements 34, 35 are thus supported in all directions.

In a modified embodiment shown in FIGS. 14 to 19, the fork-extensions 38 described above with reference to FIG. 11 can also be axially extended, and can engage in seats 42 in the region of the spring-loaded axially-guided bearing plunger 43. This provides trouble-free axial longitudinal guidance of the bearing plunger 43 in the lock pin 40 shown in FIGS. 14 and 15.

In a similar embodiment to FIGS. 9 to 13, the fork-extensions 38 can in this case too engage in slots 41 in the opposite-way locking elements 34, 35, so replacing the bearing-axles 37 formed on the locking elements 34, 35 as shown in FIG. 16. FIG. 19 illustrates this.

A feature common to all embodiments is that a pinless pivot-bearing of the locking elements 2, 3; 32, 33; 34, 35 is shown, and that the locking elements, as rigid, rather than flexible, bodies, have an excellent locking action combined with good resistance to shear forces.

DRAWING LEGEND 1 lock pin
2 locking element
3 locking element
4 body
5 recess
6 locking body
7 bevel
8 pushrod
9 claw
10 claw
11 gap
12 pivot axis
13 blade
14 interior of bearing thimble
15 bearing thimble
16 projection
17 cap
18 recess
19 spring element
20 claw
21 direction arrow
22 bearing shell (of 2, 3)
23 operating button
24 bearing plunger
25 shoulder
26 bevel
27 guide web
28 stop web
29 guide slot
30 lock pin
31 recess
32 locking element
33 locking element
34 locking element
35 locking element
36 bearing plunger
37 bearing-axle
38 fork-extension
39 extension
40 lock pin
41 slot
42 seat
43 bearing plunger
44 bearing block

What is claimed is:

1. Lock pin with push-button-operated axial locking, comprising:
    a tubular body having radially outwards directed recesses;
    an actuating plunger in said tubular body and axially displaceable under spring loading;
    a plurality of rigid locking elements pointing in opposite directions which are mounted in said radially outwards directed recesses in the body and which are moved by pressure of said plunger, each of said plurality of rigid locking elements having at least one semi-circular claw-like portion arranged to interlock the plurality of rigid locking elements together in an interlocked position, the semi-circular claw-like portions when interlocked forming a pivot bearing shell; and
    wherein a proximate end tip of the actuating plunger forms a bearing shaft that bears against the semi-circular claw-like portions of the locking elements which form a pivot bearing shell for the bearing shaft, the bearing shaft formed by the proximate end tip of the actuating plunger sitting within the semi-circular claw-like portions and holding the plurality of rigid locking elements together in the interlocked position.

2. Lock pin according to claim 1, wherein the locking elements are rigid, inflexible bodies.

3. Lock pin with push-button-operated axial locking, comprising:
    a tubular body having radially outwards directed recesses;
    an actuating plunger in said tubular body and axially displaceable under spring loading;
    locking elements pointing in opposite directions which are mounted in said radially outwards directed recesses in the body and which are moved by pressure of said plunger, each of said locking elements having at least one semi-circular claw-like portion arranged to interlock the locking elements together in an interlocked position, the semi-circular claw-like portions when interlocked forming a pivot bearing shell; and
    wherein the locking elements interlock with each other and wherein a proximate end tip of the actuating plunger forms a bearing shaft that bears against the semi-circular claw-like portions of the locking elements which form a pivot bearing shell for the bearing shaft, the bearing shaft formed by the proximate end tip of the actuating plunger sitting within the semi-circular claw-like portions and holding the locking elements together in the interlocked position.

4. Lock pin according to claim 3, wherein the locking elements are rigid, inflexible bodies.

* * * * *